United States Patent
Erez et al.

(10) Patent No.: US 12,160,340 B2
(45) Date of Patent: Dec. 3, 2024

(54) ADDING HOST SYSTEMS TO EXISTING CONTAINERIZED CLUSTERS

(71) Applicant: RED HAT, INC., Raleigh, NC (US)

(72) Inventors: Daniel Erez, Tel-Aviv (IL); Ronnie Lazar, Kiryat Ono (IL); Eran Cohen, Ramat Gan (IL); Yevgeny Shnaidman, Petah-Tikva (IL); Avishay Traeger, Modiin (IL)

(73) Assignee: Red Hat, Inc., Raleigh, NC (US)

( * ) Notice: Subject to any disclaimer, the term of this patent is extended or adjusted under 35 U.S.C. 154(b) by 6 days.

(21) Appl. No.: 17/331,253

(22) Filed: May 26, 2021

(65) Prior Publication Data
US 2022/0385532 A1    Dec. 1, 2022

(51) Int. Cl.
*H04L 12/24* (2006.01)
*H04L 9/40* (2022.01)
(Continued)

(52) U.S. Cl.
CPC ...... *H04L 41/0816* (2013.01); *H04L 41/0886* (2013.01); *H04L 63/0823* (2013.01); *H04L 67/1097* (2013.01); *H04L 67/133* (2022.05)

(58) Field of Classification Search
CPC ...... G06F 9/455; G06F 9/5005; G06F 9/5077; G06F 9/5061; G06F 9/5088; G06F 11/3433; G06F 9/4856; G06F 3/067; G06F 9/445; G06F 9/5072; G06F 8/65; G06F 9/4401; G06F 9/4416; G06F 9/45558; G06F 9/0643; G06F 16/188; G06F 16/90335; G06F 16/24573; G06F 21/602; G06F 8/63; G06F 9/547; G06F 9/45545; G06F 16/26; H04L 41/12; H04L 41/0816; H04L 61/1511; H04L 41/0806; H04L 63/0876;
(Continued)

(56) References Cited

U.S. PATENT DOCUMENTS 8,856,341 B2    10/2014    Heumesser et al.
9,256,467 B1 *    2/2016    Singh ............... G06F 9/5005
(Continued)

FOREIGN PATENT DOCUMENTS

CN    108664268 A    10/2018
EP    3245596 B1    8/2020

OTHER PUBLICATIONS

Phillips, "Using the OpenShift Assisted Installer Service to Deploy an OpenShift Cluster on Bare Metal and vSphere", Jan. 18, 2021, 8 pages https://www.openshift.com/blog/using-the-openshift-assisted-installer-service-to-deploy-an-openshift-cluster-on-metal-and-vsphere.
(Continued)

*Primary Examiner* — Dustin Nguyen
(74) *Attorney, Agent, or Firm* — Womble Bond Dickinson (US) LLP

(57) ABSTRACT

The technology disclosed herein enables adding new host systems to existing clusters. An example method comprises receiving, by a processor, identification data associated with an existing cluster; generating a cluster entity data structure of the existing cluster using the identification data; generating a discovery image using the cluster configuration data structure, wherein the discover image comprises an executable code structured according to a file system; and causing a new host system to boot using the discovery image.

14 Claims, 7 Drawing Sheets

(51) Int. Cl.
*H04L 41/08* (2022.01)
*H04L 41/0816* (2022.01)
*H04L 67/1097* (2022.01)
*H04L 67/133* (2022.01)

(58) Field of Classification Search
CPC ..... H04L 63/0892; H04L 67/34; H04L 41/04; H04L 67/535
See application file for complete search history.

(56) References Cited

U.S. PATENT DOCUMENTS

| | | | | |
|---|---|---|---|---|
| 10,740,132 | B2* | 8/2020 | Goel | G06F 9/45545 |
| 10,873,592 | B1* | 12/2020 | Singh | H04L 67/535 |
| 10,956,244 | B1* | 3/2021 | Cho | G06F 9/547 |
| 10,986,174 | B1* | 4/2021 | Sharma | H04L 41/0816 |
| 11,487,591 | B1* | 11/2022 | Featonby | G06F 9/45558 |
| 11,573,814 | B1* | 2/2023 | Aithal | G06F 16/188 |
| 2013/0117676 | A1* | 5/2013 | De Pauw | G06F 16/26 715/738 |
| 2014/0129819 | A1* | 5/2014 | Huang | G06F 9/4416 713/2 |
| 2015/0058839 | A1* | 2/2015 | Madanapalli | G06F 9/45558 718/1 |
| 2015/0242197 | A1* | 8/2015 | Alfonso | G06F 8/65 717/173 |
| 2017/0063722 | A1* | 3/2017 | Cropper | G06F 9/5061 |
| 2017/0199770 | A1* | 7/2017 | Peteva | G06F 9/5088 |
| 2017/0372173 | A1* | 12/2017 | Kairali | G06F 9/455 |
| 2018/0287883 | A1* | 10/2018 | Joshi | H04L 61/1511 |
| 2018/0349168 | A1* | 12/2018 | Ahmed | G06F 11/3433 |
| 2019/0058722 | A1* | 2/2019 | Levin | H04L 67/34 |
| 2019/0095241 | A1* | 3/2019 | Ago | G06F 16/24573 |
| 2019/0222646 | A1* | 7/2019 | Rao | G06F 3/067 |
| 2019/0394093 | A1* | 12/2019 | Kulkarni | H04L 41/12 |
| 2020/0153898 | A1* | 5/2020 | Sabath | G06F 9/4856 |
| 2020/0162330 | A1* | 5/2020 | Vadapalli | H04L 63/0892 |
| 2020/0186436 | A1* | 6/2020 | Hu | H04L 41/0806 |
| 2020/0344124 | A1* | 10/2020 | Christober | H04L 63/0876 |
| 2020/0404076 | A1* | 12/2020 | Mahadevan | H04L 67/34 |
| 2021/0034423 | A1* | 2/2021 | Hallur | G06F 9/45558 |
| 2021/0064351 | A1* | 3/2021 | Naganuma | G06F 8/63 |
| 2021/0097169 | A1* | 4/2021 | Nunez Mencias | G06F 21/602 |
| 2021/0157655 | A1* | 5/2021 | Foreman | G06F 9/5077 |
| 2021/0200814 | A1* | 7/2021 | Tal | G06F 16/90335 |
| 2021/0224093 | A1* | 7/2021 | Fu | G06F 9/5072 |
| 2021/0271506 | A1* | 9/2021 | Ganguly | H04L 41/04 |
| 2021/0328874 | A1* | 10/2021 | Jacobson | G06F 9/4401 |
| 2022/0147517 | A1* | 5/2022 | Rupprecht | G06F 9/5077 |
| 2022/0237506 | A1* | 7/2022 | Feldman | G06F 9/445 |
| 2022/0337417 | A1* | 10/2022 | Sanders | H04L 9/0643 |

OTHER PUBLICATIONS

"Deploying Installer-Provisioned Clusters on Bare Metal", Red Hat, Inc., 2021, 59 pages https://access.redhat.com/documentation/en-us/openshift_container_platform/4.6/html-single/deploying_installer-provisioned_clusters_on_bare_metal/index.

"Installing a Cluster", Red Hat, Inc., 2021, 152 pages https://access.redhat.com/documentation/en-us/openshift_container_platform/3.9/html/installation_and_configuration/installing-a-cluster.

"Installing IBM Cloud Private with OpenShift", IBM, 6 pages https://www.ibm.com/support/knowledgecenter/en/SSBS6K_3.2.0/supported_environments/openshift/install_openshift.html.

* cited by examiner

ADDING HOST SYSTEMS TO EXISTING CONTAINERIZED CLUSTERS

TECHNICAL FIELD

The present disclosure is generally related to cluster computing environments, and more particularly, to adding new host computer systems to existing containerized clusters.

BACKGROUND

Cluster computing environments can provide computing resources, such as host computer systems, networks, and storage devices that can perform data processing tasks and can be scaled to handle larger tasks by adding or upgrading resources. Virtualization techniques can be used to create multiple "virtual machines" on each physical host computer system, so the host computer systems can be used more efficiently and with greater flexibility. A hypervisor may run on each host computer system and manage multiple virtual machines. Such virtualization techniques thus provide abstractions of the physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

BRIEF DESCRIPTION OF THE DRAWINGS

The present disclosure is illustrated by way of examples, and not by way of limitation, and may be more fully understood with references to the following detailed description when considered in connection with the figures, in which.

Figure 1:
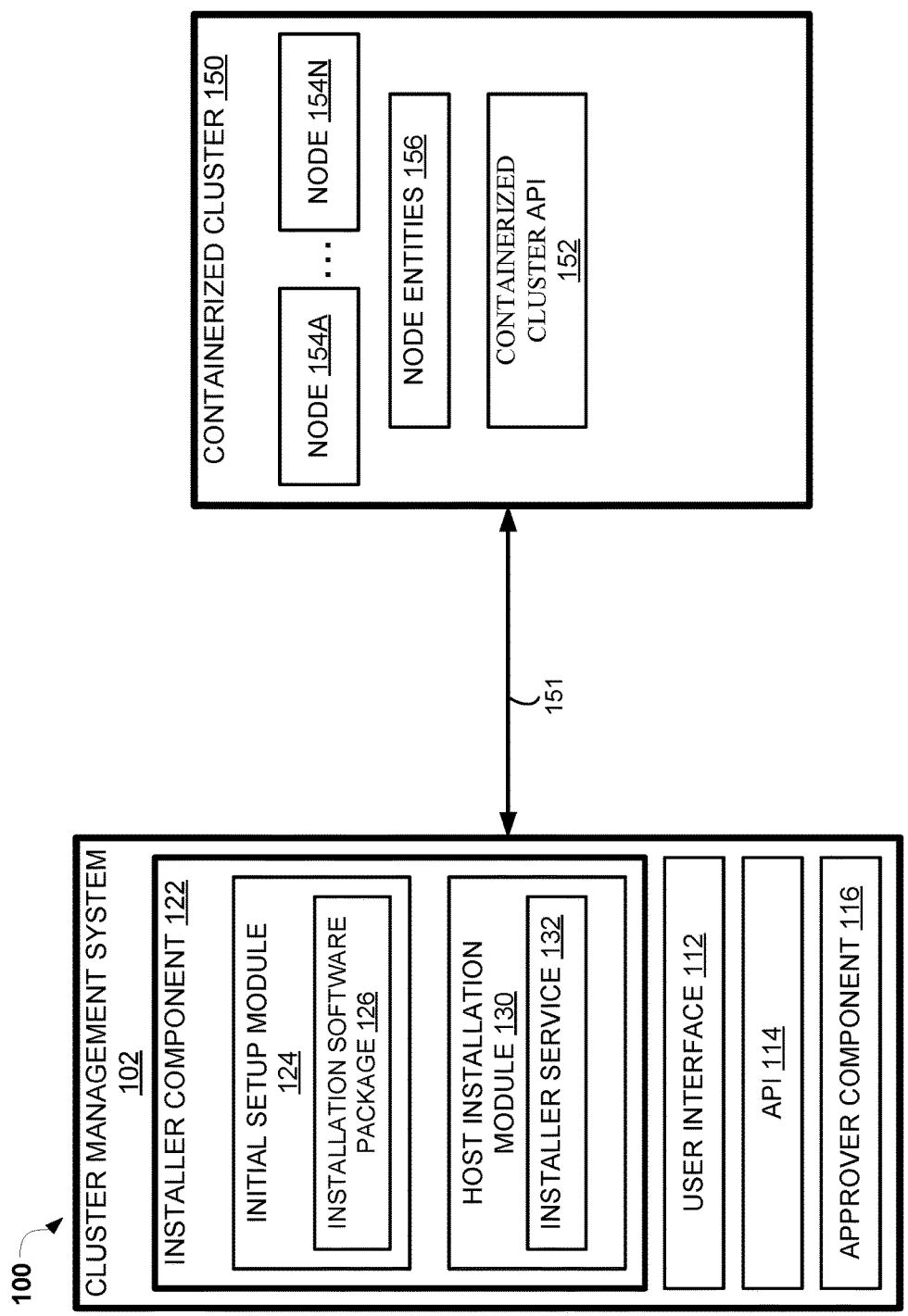
FIG. 1 depicts a block diagram of an example cluster management system that manages a containerized cluster, in accordance with one or more aspects of the present disclosure.

Described herein are systems and methods for adding new host computer systems to existing containerized clusters in cluster computing environments. A containerized cluster may be a collection of physical or virtual host computer systems (host systems) that run containerized applications. The containerized cluster may include entities that represent resources in the cluster, such as virtual machines, nodes, persistent volumes, and networks. The containerized cluster may run on-premises or in a cloud. A containerized application may run in association with a container, which may handle infrastructure-related tasks such as deployment of the application for operation. The container may include the application and the application's dependencies, which may include libraries and configuration information.

A cluster management system may manage deployment and maintenance of the containerized cluster (hereafter "cluster"). During the deployment phase, the cluster management system may install a cluster(s) on the physical and/or virtual host systems. In particular, the cluster management system may use an installation software package to build, install, setup, test, configure and/or approve a cluster on a set of host systems. The host systems may include one or more master hosts which run master systems (e.g., an API server), and one or more nodes which are hosts that run agents and/or proxies. The installation software package may include design data, settings data, configuration data, and/or metadata necessary to create and launch the containerized cluster. Once the containerized cluster is operational, the cluster management system may delete the installation software package from its memory.

During the maintenance phase, the cluster management system may perform management functions related to running, maintaining and supporting the containerized cluster so that it runs according to a set of specified performance criteria.

In some instances, it may be desirable to scale up the containerized cluster by adding additional host systems. For example, it may be desirable to add additional host systems to load balance, to add additional virtual machines, etc. However, the installation software package that includes the cluster-related configuration data may have been deleted from the cluster management system. As such, adding additional host systems this may be a time-consuming and resource-consuming process that requires retrieval of the installation software package, access to the cluster, and/or manually configuration of the new host system. Accordingly, it is desirable to provide the ability to install new host systems to an existing cluster without accessing the cluster or retrieving configuration data.

Aspects of the present disclosure address the above-noted and other deficiencies by enhancing a cluster management system with a dedicated installer component to add additional host systems to existing containerized clusters. In an example, a cluster can be installed and managed in a cloud computing environment. To add a new host system to the cluster, the cluster management system may first receive a command to add a new host system to the cluster. For example, a user, via a user interface associated with the cluster management system or with a client device in communication with the cluster management system, may select a particular cluster and invoke an operation (e.g., select a button) to add the new host system to the cluster. The host system can be a bare-metal host or a virtual host. The cluster management system may then send cluster identification data to an installer component. The cluster identification data may include a cluster identifier (ID) (e.g., a universally unique identifier (UUID), a globally unique identifier (GUID), etc.) and the uniform resource locator (URL) address of the installer component's Application Programming Interface ("API"). The cluster identification data may be stored in a management data structure. The installer component may be a part of the cluster management system or be a standalone application on a cloud service.

The installer component may, using the API URL address, retrieve cluster-related data (from the management data structure and using the cluster ID) for the cluster and generate a cluster entity data structure that represents the existing cluster. This allows the cluster entity data structure to be generated without reliance on the installation software package used to install the cluster. The installer component may then generate a discovery image for the cluster using the cluster configuration data structure. For example, the discovery image may be generated by the installer component by retrieving the cluster entity data structure and generating a configuration file using relevant data (e.g., a cluster URL, cluster credentials, cluster ID, authorization token, etc.) The discovery image may include executable (bootable) code structured according to a file system, such as, for example, an optical disc image (i.e., an ISO image). The discovery image can be used to provision the new host system and configure proper communication between the new host and the existing host systems of the cluster. The installer component may make the discovery image (e.g., ISO image) accessible in the user interface. For example, the user interface may provide retrieval functions (e.g., downloading via a web link, saving, etc.), to the user, for the discovery image. Once the discovery image is retrieved by the user interface, the user interface may provide functions that enable mounting the discovery image to the new host system, and booting the new host system using the discovery image. Mounting can refer to a process by which an operating system acquires access to a storage medium, recognizing, reading and processing the file system structure and metadata on the storage medium, and registering the file system structure and metadata to a virtual file system (VDS) component. During the initialization of the new host system, the new host system can retrieve the cluster's configuration data and/or settings data using the API URL address, and write the configuration data and/or settings data to its boot disk.

In some embodiments, the new host system may need to be approved by the cluster management system. For example, after being installed, the new host system and/or the cluster may request approval to operation from the cluster management system. In some embodiments, the cluster (via, for example, its primary node), may request one or more (signed) authentication certificates from the cluster management system. The authentication certificates may include a client certificate (for securely communicating with the cluster API), a server certificate (for use by the cluster management system's API to communicate with the cluster), a root certificate, and intermediate certificate, etc. The request may be approved automatically via an approver component of the cluster management system (e.g., in response to verifying the identification of the cluster and/or the new host system, in response to verifying configuration data of the new host system, etc.) or manually (e.g., via a user interface). The cluster management system may generate the one or more authentication certificates during and/or upon approval of the new host system. Once approved, the cluster management system may send one or more of the certificates to the cluster and/or store one or more certificates locally. In some embodiments, the cluster management system may further verify that the new host system can communicate with the cluster management system and/or the other host systems in the cluster.

In another example, a cluster may be installed and managed on-premises (e.g., on a set of local bare-metal computer systems), rather than on the cloud. To add a new host system to the cluster, a user may deploy an operator. An operator may include software running on the cluster that interacts with the cluster's API and is capable of packaging, deploying, and managing a cluster-based application. The operator may include an installer service for installing the new host system and a controller for approving the new host system. The operator may retrieve the cluster's configuration data and generate a cluster entity data structure that represents the existing cluster. The operator may then add the new host system to the cluster configuration data structure, and generate a discovery image for the cluster using the cluster configuration data structure. The cluster management system may then mount the discovery image to the new host system, and boot the new host system using the discovery image. Once booted, the new host system may be approved by the cluster management system. Accordingly, aspects of the present disclosure simplify adding new host systems to existing clusters by using shell cluster entities to generate a discovery image, where the discovery image is used to add new host systems to existing clusters.

FIG. 1 depicts a block diagram of an example cluster management system 102 that manages a containerized computing cluster 150 ("containerized cluster"), in accordance with one or more aspects of the present disclosure. The cluster management system 102 may be used to simplify administrative tasks involved in operating the computing environment 100. For example, the cluster management system 102 may be used to add additional host computer systems to a containerized cluster 150 and monitor their status. The virtual and physical resources of the cluster management system 102 may include virtual machines, host computer systems, virtual disks, virtual networks, and so on. The cluster management system 102 may provide user interface(s) 112 that users such as system administrators may use to manage cluster management system 102 and/or the containerized cluster 150.

Applications can be developed using containers that handle infrastructure-related tasks such as deployment of applications for operation. A container may include the application and the application's dependencies, such as libraries and configuration information. The term "containerized application" may refer to a container that contains the application and the application's dependences. A containerized application may be run on a host computer system that has a suitable operating system and runtime engine. Container computing platforms can automate container operations, such as deploying, managing, and scaling containerized applications. For example, a container computing platform may schedule and run containers on clusters of physical or virtual machines and provide system management tools to simplify the administration of the clusters. The term "containerized cluster" may refer to a cluster that may run containerized applications using a container computing platform. A containerized cluster 150 may represent a set of host computing devices and associated resources such as storage devices. The containerized cluster 150 may include virtual and physical resources, which may be represented in the containerized cluster as cluster entities 156. The cluster entities 156 may include virtual machines, cluster nodes, persistent volumes, virtual networks, and so on.

In some embodiments, the cluster management system 102 and/or the containerized cluster(s) 150 on which the container computing platform runs may be accessible via a network such as the Internet, and may be provided as cloud services. Thus, the cluster entities 156 may execute in a cloud environment. In some embodiments, the containerized cluster 150 and the cluster management system 102 may be installed and run on-premises (e.g., on a local set of bare-metal computer systems), rather than on the cloud. For example, the containerized cluster 150 and the cluster management system 102 be installed and operated on one or more locally interconnected servers.

As depicted in FIG. 1, a computing environment 100 includes the cluster management system 102 and the containerized cluster 150. The cluster management system 102 may include installer component 122, user interface 112, cluster management system Application Programming Interface (API) 114, and approver component 116. Installer component 122 may include initial setup module 124 and host installation module 130. Initial setup module 124 may execute a deployment phase to install and run the containerized cluster 150. For example, the cluster management system 102 may execute installation software package 126 to build, install, setup, test, configure and/or approve containerized cluster 150 on one or more physical and/or virtual host systems. In some embodiments, installation software package 126 may be retrieved from the Internet (e.g., from a web application, from a cloud computing service, etc.), a data store, a physical device, etc. In other embodiments, installation software package 126 may be developed using the cluster management system 102. Once the containerized cluster 150 is deployed, the cluster management system 102 may remove installation software package 126 from its memory.

The containerized cluster 150 may include one or more nodes 154A-154N. The nodes 154A-154N may run containerized applications and are represented in the containerized cluster as node entities. The node entities 156 can be used to manage node computer systems by invoking, via an Application Programming Interface ("containerized cluster API 152"), operations (e.g., create, update, and delete operations) with the node entities as parameters. The containerized cluster 150 includes other entities that represent other cluster resources. The node entities 156 can include containers, pods, persistent volumes, networks, namespaces, persistent volume claims, storage classes, custom resources, and others. A container entity can represent an execution environment in which applications run. A pod entity can represent a set of containers that share resources, similar to a logical host machine. A persistent volume (PV) entity can represent a persistent storage device such as a disk. A namespace entity can represent a scope for resource name. A persistent volume claim (PVC) entity can represent a request for storage that can be fulfilled by persistent volumes. A storage class entity can represent a classes of storage, such as a particular quality of service level. A custom resource entity can represent a resource that is an extension of the containerized cluster API 152 that is not necessarily available in a default containerized cluster installation. A custom resource may be a virtual machine, for example. Custom resources can be represented as cluster entities, e.g., virtual machine entities, which may be provided by a virtual machine custom resource.

Although not shown, there may be any combination of multiple containerized clusters 150, multiple nodes 154A-N, and multiple node entities 156 of each type (e.g., another virtual machine entity), or cluster entities of other types (e.g., to represent other types of virtual or physical resources).

The installer component 122 may interact with the containerized cluster 150 via a containerized cluster API 152 through a communication path 151. The communication path may be, e.g., inter-machine network communication connections or intra-machine communication.

The host installation module 130 may add one or more host computer systems to the containerized cluster 150. In some embodiments, the host installation module 130 may be an operator. In particular, cluster management system 102 may provide an interface, such as user interface 112, to a user. In some embodiments, the user interface 112 may be part of the cluster management system 102. In some embodiments, the user interface 112 may be provided remotely, such as, for example, via a client device using an application program or browser. In some embodiments, the user interface 112 may be part of API 114. The host installation module may be initiated via user interface 112. For example, a user, via a user interface 112, may select a particular cluster and invoke an operation (e.g., select a button) to add the new host system to the cluster. The cluster can be selected using a cluster ID, from a list provided by API 114, etc. The host system (not shown) can be a bare-metal host or a virtual host. Once selected, the host installation module 130 may send cluster related data to installer service 132. The cluster identification data may include identification type data associated with the containerized cluster 150, such as, for example, a cluster identifier (ID), the internet protocol (IP) address of an API (e.g., API 114, an installer service API, containerized cluster API 152, etc.), a URL address of an API (e.g., API 114, an installer service API, containerized cluster API 152, etc.), etc.

Installer service 132 may be part of the host installation module 130 or may be accessible via a network and may be provided as a cloud service (e.g., a via a standalone application on a cloud service). The installer service 132 may include an API (not shown) or may use API 114 (as part of installer service 132 or as a separate component). The installer service 132 may, using the API 114 URL address, retrieve cluster-related data from a management data structure of the cluster management system (not shown) and generate a cluster entity data structure that represents the containerized cluster 150. The cluster-related data may include cluster ID, cluster name, cluster URL, cluster API address, cluster type (e.g., shell, dummy, etc.) cluster release version, username (e.g., id or name of user initiating the operation to add the new host system), etc. The installer service 132 may then generate a discovery image for the containerized cluster 150 using the cluster entity data structure. The discovery image may include executable (bootable) code structured according to a file system. For example, the discovery image may be a disk image, a boot image, an optical disc image (ISO image), etc. In some embodiments, the discovery image may be generated (by installer service 132 in response to a request by user interface 112 or the API 114), by retrieving the cluster entity data structure and generating a configuration file using relevant data (e.g., a cluster URL, cluster credentials, cluster ID, authorization token, etc.).

The installer service 132 may make the discovery image available to the user interface 112 or the API 114. For example, the user interface 112 may provide retrieval functions (e.g., downloading via a web link, saving, etc.), to the user, for the discovery image. The discovery image may be used to discover the new host system and to configure proper communication between the new host system and the host systems of the containerized cluster 150.

Once the discovery image is retrieved by the user, the user interface 112 may provide functions that enable mounting the discovery image to the new host system, and booting the new host system using the discovery image. Mounting can refer to a process by which an operating system acquires access to a storage medium, recognizing, reading and processing the file system structure and metadata on the storage medium, and registering the file system structure and metadata to a virtual file system (VDS) component. For example, the user interface 112 may provide a button to initiate the mount and boot onto the new host system. During the initialization of the new host system, the new host system can retrieve the containerized cluster 150 configuration data and/or settings data using the containerized cluster API 152 URL address, and write the configuration data and/or settings data to its boot disk. Once booted, user interface may provide an indication of a successful boot.

Approver component 116 may be a verification system used by the cluster management system 102 to authenticate the new host system and/or verify that the new host system is properly communicating with nodes 154A-154N, with containerized cluster API 152, and/or with API 114. After being installed, the new host system and/or the containerized cluster 150 may generate one or more authentication certificates for approval by the cluster management system 102. The certificate(s) may be approved manually (e.g., via the user interface 112) or automatically by approver component 116. In some embodiments, to authenticate the new host system, certificate data may be compared to verification data generated by, for example, the installer service 132. If the certificate data matches the verification data, the approver component 116 may approve the new host system for operation. The authentication certificates may include a client certificate, a server certificate, a root certificate, and intermediate certificate, etc.

Figure 2:
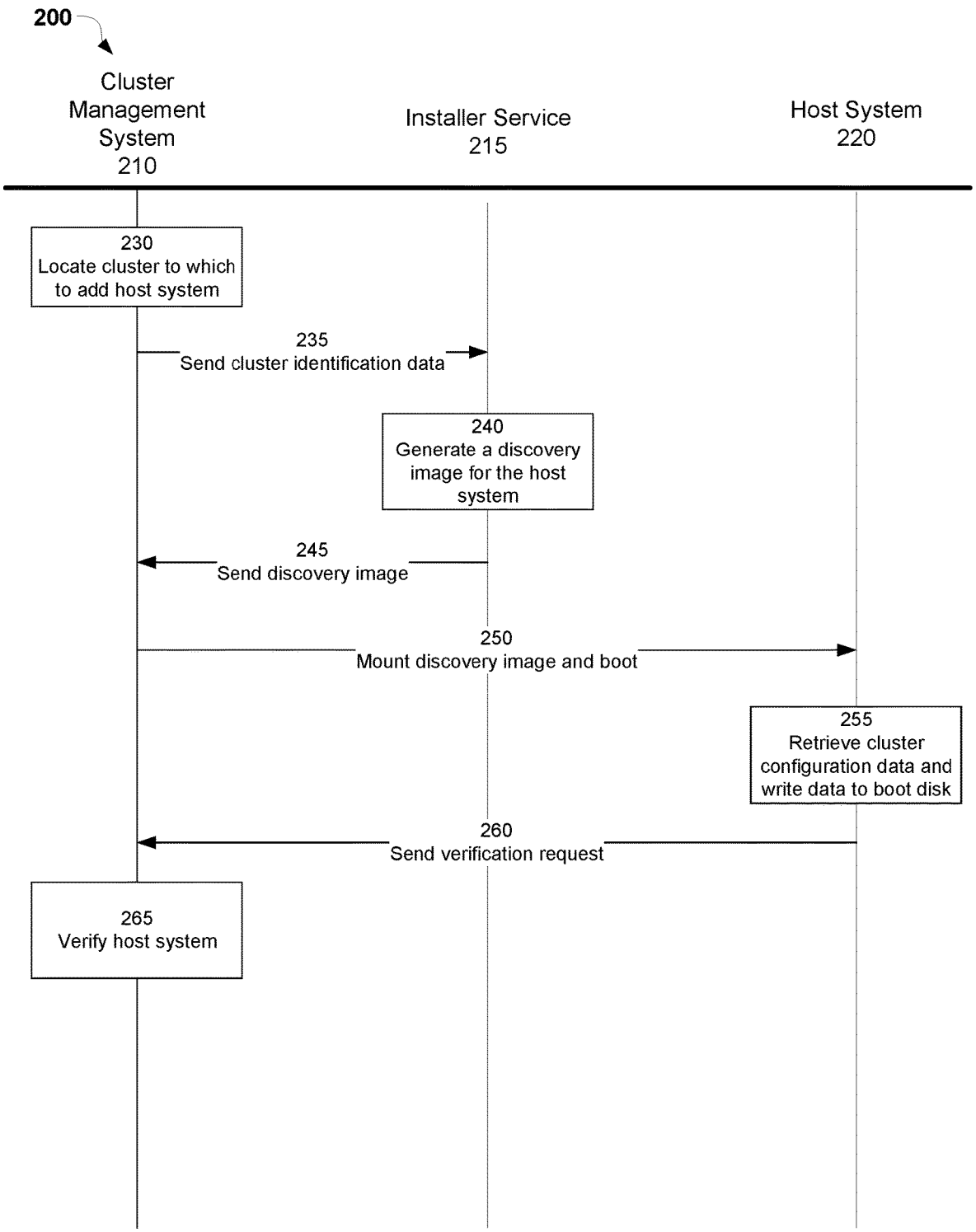
FIG. 2 depicts an interaction diagram illustrating adding a new host system to a cluster managed by a cloud service, in accordance with one or more aspects of the present disclosure.

FIG. 2 depicts an interaction diagram 200 illustrating adding a new host system to a cluster managed using a cloud service, in accordance with one or more aspects of the present disclosure. The interaction diagram 200 includes blocks that may be understood as being similar to blocks of a flow diagram of a method. Thus, if performed as a method, the blocks shown in the interaction diagram 200 (blocks that perform operations), the method and each of its individual functions, routines, subroutines, or operations may be performed by one or more processors of a computer device executing the method.

The blocks shown in diagram 200 may be performed by processing devices of a server device or a client device (e.g., a host computer system) of a computer system (e.g., system 100). Diagram 200 illustrates cluster management system 210, installer service 215, and host system 220. One or more components or processes of diagram 200 may correspond to those of FIG. 1. By way of illustrative example, diagram 200 depicts a scenario where a cluster is managed using a cloud service.

At block 230, cluster management system 210 may locate a cluster to which to add host system 220. For example, a user, via a user interface of cluster management system 210 or with a client device in communication with the cluster management system 210, may select a particular cluster and invoke an operation to add host system 220 to the cluster.

At block 235, the cluster management system 210 may send cluster identification data associated with the located cluster to installer service 215. The cluster identification data may include a cluster ID and the URL address of the cluster management system's API. The installer service 215 may be a part of the cluster management system or be a standalone application on a cloud service.

At block 240, the installer service 215 may generate a discovery image for the host system 220. In some embodiments, the installer service 215 may, using the API URL of the service address, retrieve configuration data from the cluster and generate a cluster entity data structure that represents the cluster. This allows the cluster entity data structure to be generated without reliance on the installation software package used to install the cluster. The installer service 215 may then generate the discovery image for the cluster using the cluster configuration data structure. The discovery image may include executable code structured according to a file system, such as, for example, an ISO image. In some embodiments, the discovery image can be a binary image containing configuration files used to configure the cluster. Using the configuration files, the discovery image can be used to provision the host system 220 and configure proper communication between the host system 220 and the existing host systems of the cluster.

At block 245, the installer component 215 may send the discovery image to the cluster management system 210. The discovery image may be sent automatically upon generation, or in response to a user input. For example, the user interface of the cluster management system 210 may provide retrieval functions (e.g., downloading via a web link, saving, etc.), to the user, for the discovery image.

At block 250, the cluster management system 210 may mount the discovery image to the host system 220, and cause the discovery image to execute on the host system 220. At block 255, the host system 220 may retrieve the cluster's configuration data and/or settings data using the API URL address, and write the configuration data and/or settings data to its boot disk. The configuration data and/or settings data may be related to data used to initially configure the cluster. In particular, the configuration data and/or settings data can include some or all aspects of the installation software package that was used to build, install, setup, test, configure and/or approve a cluster on a set of host systems.

At block 260, the host system 220 may send a verification request to the cluster management system 210. The verification request can be used to request one or more authentication certificates from the cluster management system 210. For example, cluster (via, for example, its primary node), may request one or more signed authentication certificates from the cluster management system. The authentication certificates may include a client certificate (for securely communicating with the cluster API), a server certificate (for use by the cluster management system's API to communicate with the cluster), a root certificate, and intermediate certificate, etc.

At block 265, the cluster management system 210 may approve the host system and generate one or more authentication certificates. The request may be approved automatically (via an approver component) of the cluster management system 210 (e.g., in response to verifying the identification of the cluster and/or the new host system, in response to verifying configuration data of the host system 220, etc.) or manually (e.g., via a user interface). The cluster management system 210 may generate the one or more authentication certificates during and/or upon approval of the new host system. Once approved, the cluster management system 210 may send one or more certificates to the cluster and/or store one or more certificates locally. In some embodiments, the cluster management system may further verify that the new host system can communicate with the cluster management system 210 and/or the other host systems in the cluster.

Figure 3:
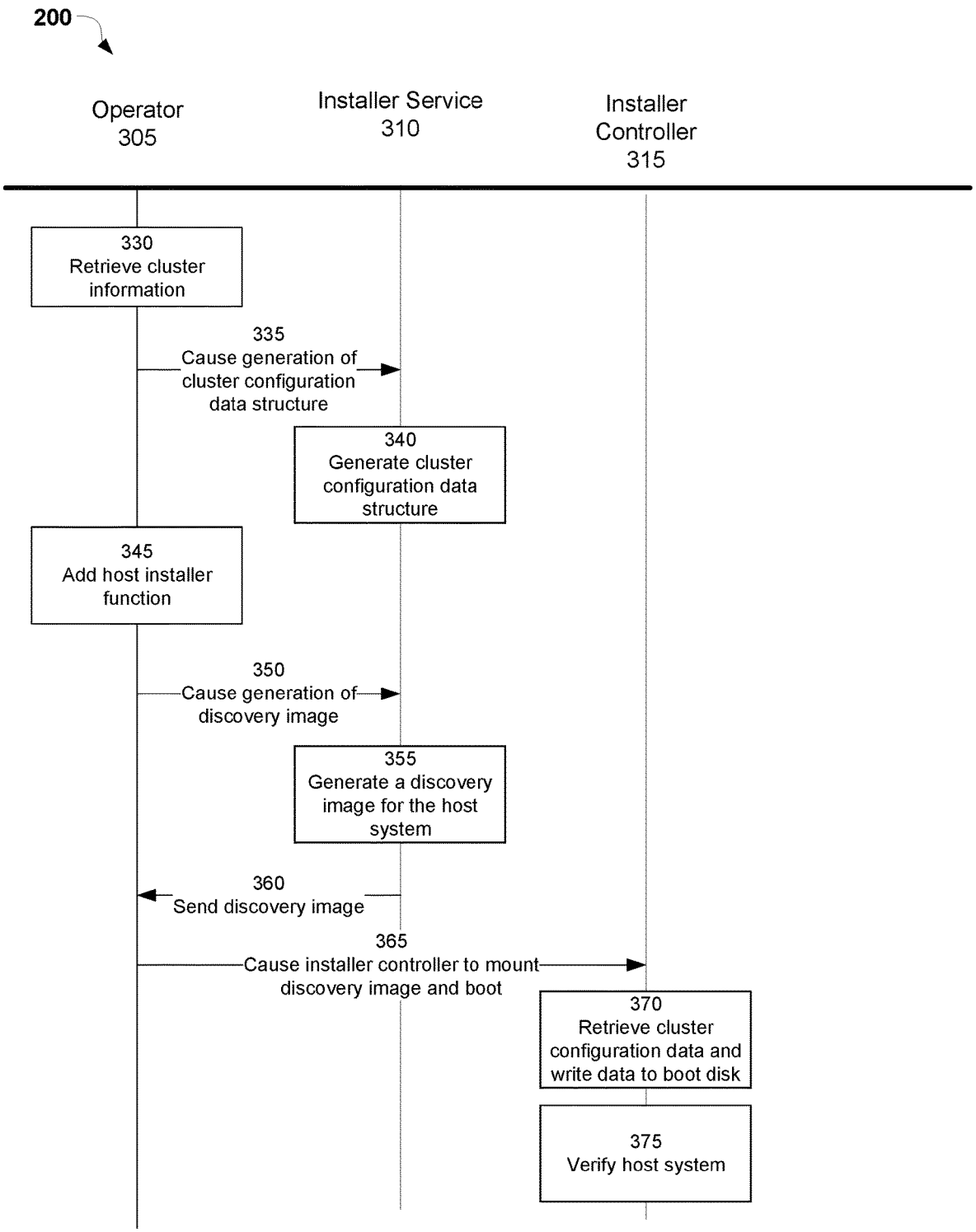
FIG. 3 depicts an interaction diagram illustrating adding a new host system to a cluster managed on-premises, in accordance with one or more aspects of the present disclosure

FIG. 3 depicts an interaction diagram 300 illustrating adding a new host system to a cluster managed on-premises, in accordance with one or more aspects of the present disclosure. The interaction diagram 300 includes blocks that may be understood as being similar to blocks of a flow diagram of a method. Thus, if performed as a method, the blocks shown in the interaction diagram 300 (blocks that perform operations), the method and each of its individual functions, routines, subroutines, or operations may be performed by one or more processors of a computer device executing the method.

The blocks shown in diagram 300 may be performed by processing devices of a server device or a client device (e.g., a host computer system) of a computer system (e.g., system 100). Diagram 300 illustrates cluster management system 310, installer service 315, and host system 220. One or more components or processes of diagram 300 may correspond to those of FIG. 1. By way of illustrative example, diagram 300 depicts a scenario where a cluster is installed and managed on-premises (e.g., on a set of local bare-metal computer systems), rather than on the cloud.

To initiate adding a new host to the cluster, operator 305 may be deployed on the computer system operating the cluster. An operator may include software running on the cluster that interacts with the cluster's API and is capable of packaging, deploying, and managing a cluster-based application. In some embodiments, the operator 310 may be part of a cluster management system (e.g., cluster management system 102) that runs locally on the computer system. In some embodiments, the operator can include installer service 310 and installer controller 315.

At block 330, the operator 305 may retrieve the cluster's configuration data. For example, the operator 305 can retrieve a configuration file, from a data structure of the computer system and/or cluster, associated with the cluster. The configuration file can include data and/or settings used to initially configure the cluster. At block 335, the operator 305 can cause the installer service to generate a cluster entity data structure that represents the cluster. At block 340, the installer service 310 can generate the cluster configuration data structure.

At block 345, operator 305 may provide, via a user interface, a host installer function for a user to add host system 320 to the cluster. For example, a user, via the user interface may invoke an operation to a add host system to the cluster.

At block 350, responsive to receiving a user input to add host system to the cluster, the operator may cause the installer service 310 to generate a discovery image. At block 355, the installer service 315 may generate the discovery image for the host system using the cluster configuration data structure. The discovery image may include executable code structured according to a file system, such as, for example, an ISO image. The discovery image can be used to provision the host system and configure proper communication between the host system 320 and the existing host systems of the cluster.

At block 360, the installer service 310 may send the discovery image to the operator 305. The discovery image may be sent automatically upon generation, or in response to a user input. For example, the user interface of the operator may provide retrieval functions (e.g., downloading, saving, etc.), to the user, for the discovery image.

At block 365, the operator 305 may cause the installer controller 315 to mount the discovery image to the host system, and cause the discovery image to execute on the host system. At block 370, the installer controller 315 may retrieve the cluster's configuration data and/or settings data and write the configuration data and/or settings data to the host system's boot disk. At block 375, the installer controller 315 may verify (approve) the host system.

Figure 4:
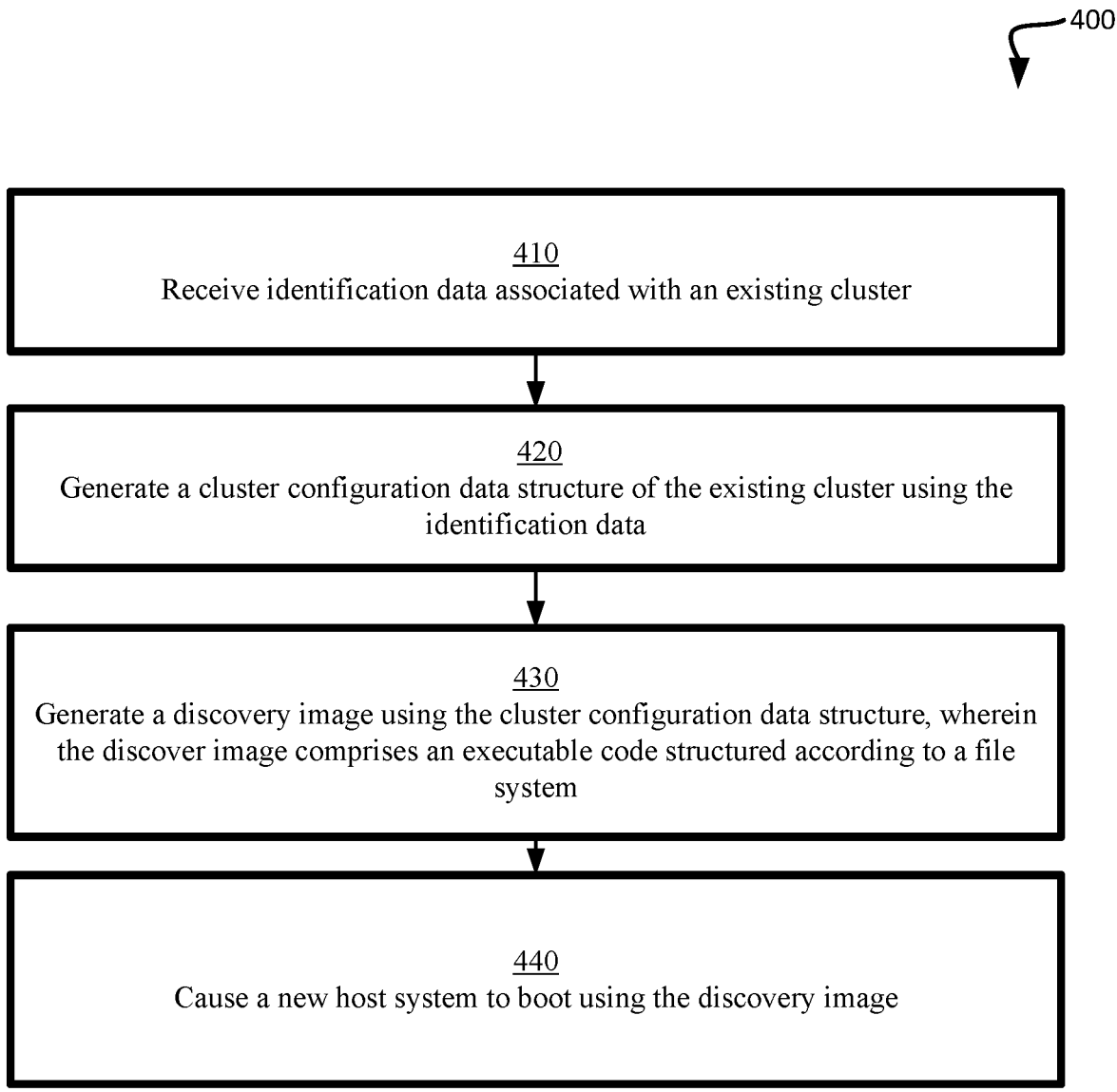
FIG. 4 depicts a flow diagram of an example method for adding a new host system to a cluster, in accordance with one or more aspects of the present disclosure.

FIG. 4 depicts a flow diagram of an example method 400 for adding new host systems to an existing cluster, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a computer system may receive identification data associated with an existing cluster. The identification data may include an identifier of the existing cluster and/or a URL address of an API used by computer system (e.g., API 114, an API used by installer service 132, etc.).

At block 420, the computer system may generate a cluster entity data structure of the existing cluster using the identification data.

At block 430, the computer system may generate a discovery image using the cluster configuration data structure, wherein the discovery image comprises an executable code structured according to a file system. The discovery image may be a disk image, a boot image, an ISO image, etc. In some embodiments, the discovery image may be generated using a cloud service. In some embodiments, the discovery image may be generated using on-premises software.

At block 440, the computer system may cause a new host system to boot using the discovery image. In some embodiments, the computer system may retrieve at least one of cluster configuration data or settings data using the API URL address. In some embodiments, the computer system may generate one or more authentication certificates and approve the new host system using the one or more authentication certificates. Responsive to completing the operations described herein above with references to block 440, the method may terminate.

Figure 5:
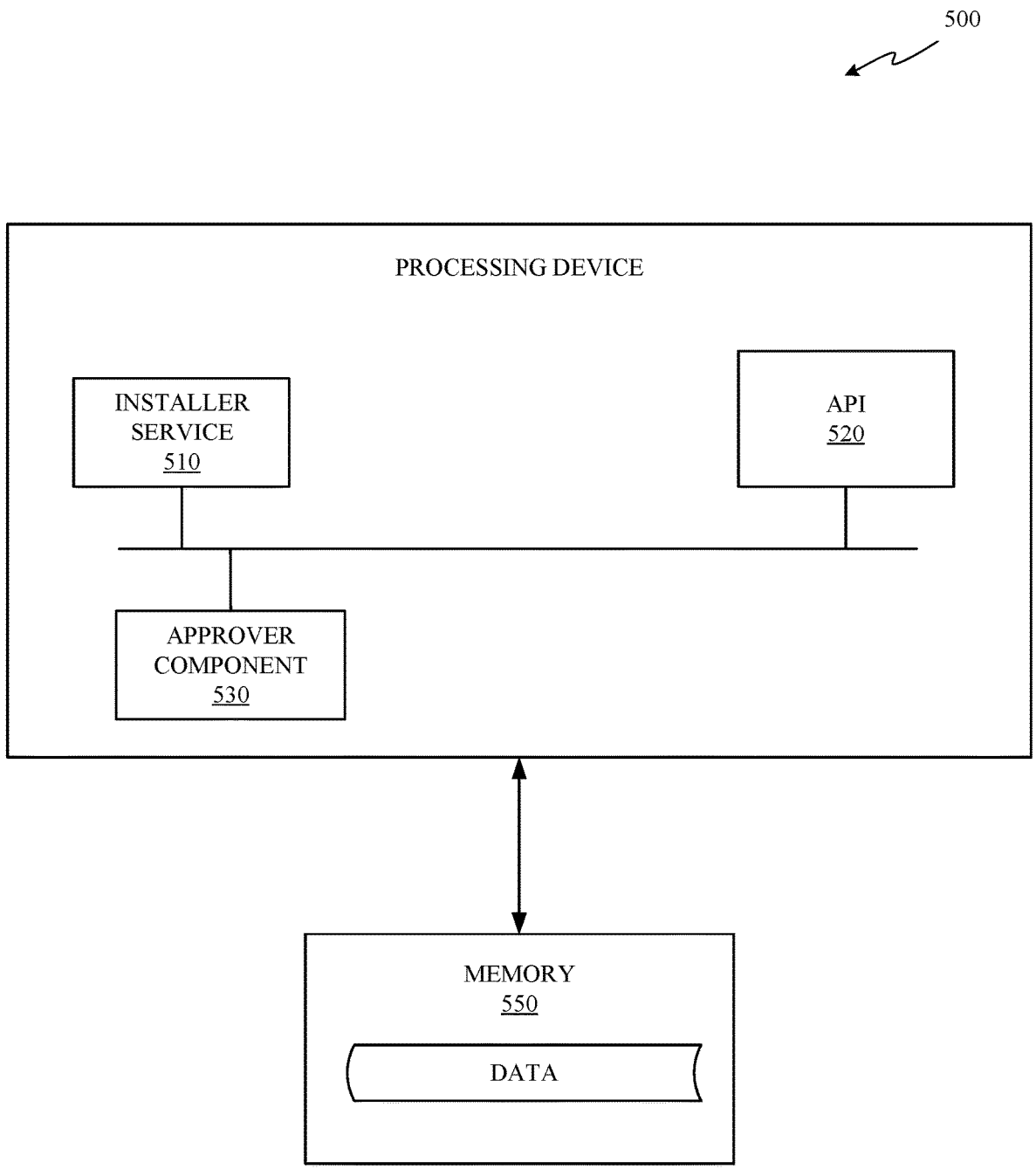
FIG. 5 depicts a block diagram of a computer system operating in accordance with one or more aspects of the present disclosure.

FIG. 5 depicts a block diagram of a computer system 500 operating in accordance with one or more aspects of the present disclosure. One or more of the components of FIG. 1 may execute on computer system 500. Computer system 500 may be the same or similar to cluster management system 102 of FIG. 1, and may include one or more processors and one or more memory devices. In the example shown, computer system 500 may include installer service 510, API 520, approver component 530, and memory 550.

Installer service 510 may receive identification data associated with an existing cluster. The identification data may include an identifier of the existing cluster and/or an URL address of API 520 retrieved from memory 550. API 52 may be similar to API 114, an API used by installer service 132, etc., Memory 550 may be a data structure maintained by the cluster management system. Installer service 510 may generate a cluster entity data structure of the existing cluster using the identification data. Installer service 510 may generate a discovery image using the cluster configuration data structure. The discover image may include an executable code structured according to a file system. The discovery image may be a disk image, a boot image, an ISO image, etc. In some embodiments, the discovery image may be generated using a cloud service. In some embodiments, the discovery image may be generated using on-premises software.

The installer service 510 may further cause a new host system to boot using the discovery image. In some embodiments, the installer service 510 may retrieve at least one of cluster configuration data or settings data using the API 520 URL address.

The approver component 530 may approve the new host system and generate one or more authentication certificates. For example, in response to a request received from the new host system, the approver component may automatically approve the new host system (e.g., by verifying the identification of the cluster and/or the new host system, in response to verifying configuration data of the new host system, etc.) or manually approve the new host system (e.g., via user input from a user interface). The approver component 530 may generate the one or more authentication certificates during and/or upon approval of the new host system. Once approved, the approver component 530 may send one or more certificates to the cluster and/or store one or more certificates locally. In some embodiments, the approver component 530 may further verify that the new host system can communicate with the cluster management system 210 and/or the other host systems in the cluster.

Figure 6:
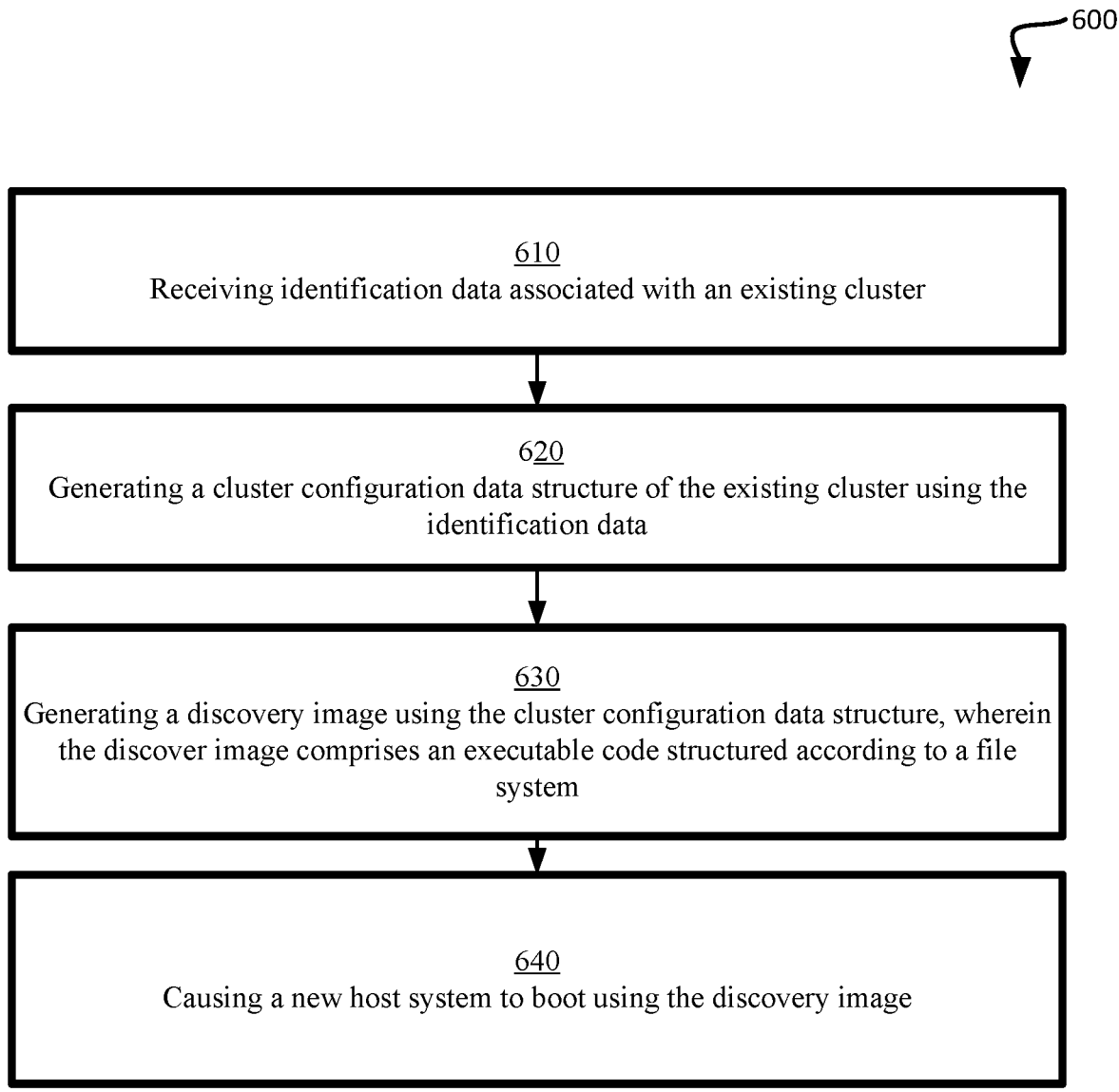
FIG. 6 depicts a flow diagram of another example method for adding a new host system to a cluster, in accordance with one or more aspects of the present disclosure.

FIG. 6 depicts a flow diagram of one illustrative example of a method 600 for adding new host systems to an existing cluster, in accordance with one or more aspects of the present disclosure. Method 600 may be similar to method 400 and may be performed in the same or a similar manner as described above in regards to method 600. Method 600 may be performed by processing devices of a server device or a client device and may begin at block 610.

At block 610, a processing device may receive identification data associated with an existing cluster. The identification data may include an identifier of the existing cluster and/or an URL address of an API used by a computer system (e.g., API 114, an API used by installer service 132, etc.).

At block 620, the processing device may generate a cluster entity data structure of the existing cluster using the identification data.

At block 630, the processing device may generate a discovery image using the cluster configuration data structure, wherein the discover image comprises an executable code structured according to a file system. The discovery image may be a disk image, a boot image, an ISO image, etc. In some embodiments, the discovery image may be generated using a cloud service. In some embodiments, the discovery image may be generated using on-premises software.

At block 640, the processing device may cause a new host system to boot using the discovery image. In some embodiments, the processing device may retrieve at least one of cluster configuration data or settings data using the API URL address. In some embodiments, the processing device may generate one or more authentication certificates and approve the new host system using the one or more authentication certificates. Responsive to completing the operations described herein above with references to block 640, the method may terminate.

Figure 7:
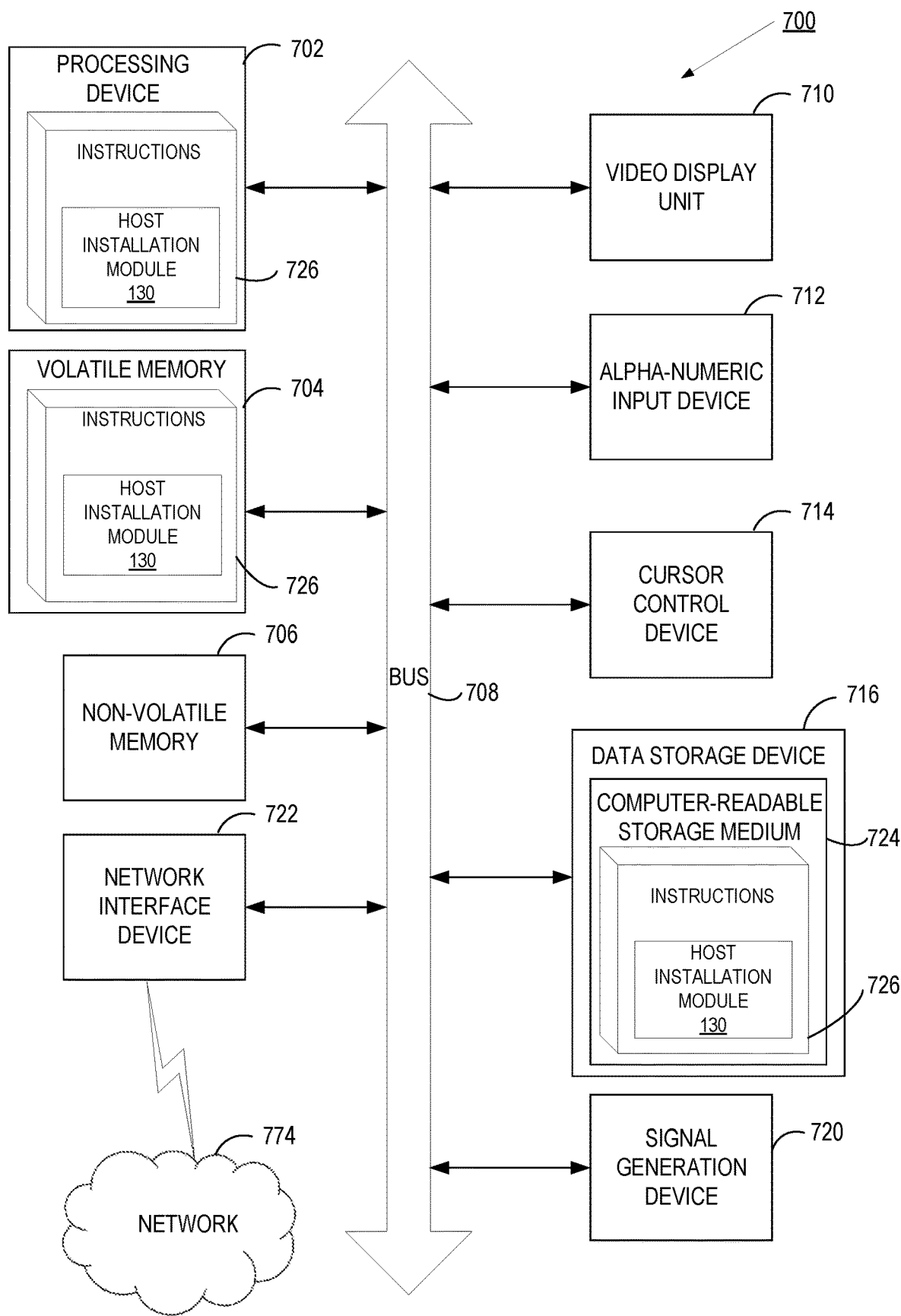
FIG. 7 depicts a block diagram of an example computer system operating in accordance with one or more aspects of the present disclosure.

FIG. 7 depicts a block diagram of a computer system operating in accordance with one or more aspects of the present disclosure. In various illustrative examples, computer system 700 may correspond to computing environment 100 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 400 and 600.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 600 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processor, identification data associated with an existing cluster, wherein the identification data comprises an identifier of the existing cluster and references an Application Programming Interface (API) of an installer component of the existing cluster;
   retrieving, via the Application Programming Interface ("API") referenced by the identification data, configuration data comprising data used to initially configure the existing cluster;
   generating a cluster entity data structure that represents the existing cluster using the configuration data, the existing cluster comprising one or more current host systems;
   generating a discovery image using the cluster entity data structure, wherein the discovery image comprises an executable code structured according to a file system; and
   adding a new host system to the existing cluster by causing the new host system to retrieve, via the API, the configuration data and write the configuration data to a boot disk associated with the new host system.

2. The method of claim 1, wherein the discovery image is an optical disc image.

3. The method of claim 1, further comprising:
   generating one or more authentication certificates; and
   approving the new host system in view of the one or more authentication certificates.

4. The method of claim 1, wherein the discovery image is generated using a cloud service.

5. The method of claim 1, wherein the discovery image is generated using on-premises software.

6. A system comprising:
   a memory;
   a processing device operatively coupled to the memory, the processing device configured to:
   receive identification data associated with an existing cluster, wherein the identification data comprises an identifier of the existing cluster and references an Application Programming Interface (API) of an installer component of the existing cluster;

retrieve, via the Application Programming Interface ("API") referenced by the identification data, configuration data comprising data used to initially configure the existing cluster;

generate a cluster entity data structure that represents the existing cluster using the configuration data, the existing cluster comprising one or more current host systems;

generate a discovery image using the cluster entity data structure, wherein the discovery image comprises an executable code structured according to a file system; and add a new host system to the existing cluster by causing the new host system to retrieve, via the API, the configuration data and write the configuration data to a boot disk associated with the new host system.

7. The system of claim 6, wherein the discovery image is an optical disc image.

8. The system of claim 6, wherein the processing device is further configured to:

generate one or more authentication certificates; and approve the new host system in view of the one or more authentication certificates.

9. The system of claim 6, wherein the discovery image is generated using a cloud service.

10. The system of claim 6, wherein the discovery image is generated using on-premises software.

11. A non-transitory machine-readable storage medium storing executable instructions that, when executed by a processing device, cause the processing device to:

receive identification data associated with an existing cluster, wherein the identification data comprises an identifier of the existing cluster and references an Application Programming Interface (API) of an installer component of the existing cluster;

retrieve, via the Application Programming Interface ("API") referenced by the identification data, configuration data comprising data used to initially configure the existing cluster;

generate a cluster entity data structure that represents the existing cluster using the configuration data, the existing cluster comprising one or more current host systems;

generate a discovery image using the cluster entity data structure, wherein the discovery image comprises an executable code structured according to a file system; and adding a new host system to the existing cluster by causing the new host system to retrieve, via the API, the configuration data and write the configuration data to a boot disk associated with the new host system.

12. The non-transitory machine-readable storage medium of claim 11, wherein the discovery image is an optical disc image.

13. The non-transitory machine-readable storage medium of claim 11, further comprising executable instructions that, when executed by the processing device, cause the processing device to:

generate one or more authentication certificates; and approve the new host system in view of the one or more authentication certificates.

14. The non-transitory machine-readable storage medium of claim 11, wherein the discovery image is generated using at least one of a cloud service or on-premises software.

* * * * *